US012209547B2

(12) United States Patent
McIntier et al.

(10) Patent No.: US 12,209,547 B2
(45) Date of Patent: Jan. 28, 2025

(54) ENGINE CONTROLS FOR EXHAUST AFTERTREATMENT THERMAL MANAGEMENT

(71) Applicant: Cummins Inc., Columbus, IN (US)

(72) Inventors: Rebekah Lippis McIntier, Columbus, IN (US); Abram L. McCalment, Greenwood, IN (US); Chetan V. Shirsath, Columbus, IN (US); Anuj Maheshwari, Columbus, IN (US); Mihir Agshikar, Columbus, IN (US); Daniel E. Boewe, Columbus, IN (US); Michael P. Blanz, Columbus, IN (US); Daniel Christopher Villiger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 115 days.

(21) Appl. No.: 17/814,918

(22) Filed: Jul. 26, 2022

(65) Prior Publication Data

US 2022/0356851 A1 Nov. 10, 2022

Related U.S. Application Data

(63) Continuation of application No. PCT/US2020/063538, filed on Dec. 7, 2020.

(Continued)

(51) Int. Cl.

*F02D 41/00* (2006.01)
*F02D 41/02* (2006.01)

(Continued)

(52) U.S. Cl.

CPC ....... *F02D 41/029* (2013.01); *F02D 41/0087* (2013.01); *F02D 41/16* (2013.01); *F02D 41/38* (2013.01); *F02D 2200/101* (2013.01)

(58) Field of Classification Search

CPC .... F02D 41/029; F02D 41/0087; F02D 41/16; F02D 41/38; F02D 2200/101;

(Continued)

(56) References Cited

U.S. PATENT DOCUMENTS

| | | | |
|---|---|---|---|
| 7,854,114 | B2 | 12/2010 | England |
| 8,762,028 | B2 | 6/2014 | Kim et al. |

(Continued)

FOREIGN PATENT DOCUMENTS

| | | |
|---|---|---|
| DE | 102011056657 | 3/2013 |
| EP | 1961939 | 8/2008 |
| GB | 2435839 | 9/2007 |

*Primary Examiner* — Matthew T Largi

(74) *Attorney, Agent, or Firm* — Taft, Stettinius & Hollister LLP

(57) ABSTRACT

A method includes operating an engine system including a plurality of cylinders, a plurality of fuel injectors configured to provide fuel the plurality of cylinders, a compression braking system configured to selectably brake at least a first set of the plurality of cylinders, and an exhaust aftertreatment system including at least one catalyst. The method includes determining a condition for brake-fuel operation and, in response to the act of determining, operating the engine in a brake-fuel mode wherein the compression brake is actuated to provide compression braking of the first set of the plurality of cylinders and a second set of the plurality of cylinders receives and combust fuel provided from respective ones of the plurality of fuel injectors.

18 Claims, 6 Drawing Sheets

Related U.S. Application Data

(60) Provisional application No. 62/966,578, filed on Jan. 28, 2020.

(51) Int. Cl.
*F02D 41/16* (2006.01)
*F02D 41/38* (2006.01)

(58) Field of Classification Search
CPC ........ F02D 13/04; F02D 41/027; F02D 41/08; F02D 41/0082; F01N 2430/06; F01N 2590/08; F01N 2900/08; F01N 2900/1404; F01N 2900/1602; F01N 2900/1606; F01N 3/021; F01N 3/2006; F01N 9/002
See application file for complete search history.

(56) References Cited

U.S. PATENT DOCUMENTS

2008/0010975 A1* 1/2008 Zhang ................ F01N 13/0097 60/285
2008/0196388 A1* 8/2008 Johnson .................. F02D 13/04 60/284
2008/0269994 A1* 10/2008 Karlsson .......... B60W 30/18118 192/13 R
2010/0300083 A1* 12/2010 Uemoto .................. F01N 9/002 60/311
2012/0102920 A1* 5/2012 Pipis, Jr. ................ F01N 3/103 60/297
2013/0060446 A1* 3/2013 Kim .................... F02D 41/0087 701/102
2016/0208666 A1* 7/2016 DeGeorge ............... F01N 3/023
2019/0120165 A1* 4/2019 Refalo ................ F02D 41/3854

* cited by examiner

ENGINE CONTROLS FOR EXHAUST AFTERTREATMENT THERMAL MANAGEMENT

CROSS-REFERENCE

The present application is a continuation of PCT Application No. PCT/US20/63538 filed on Dec. 7, 2020, which claims priority to and the benefit of U.S. Application No. 62/966,578, filed Jan. 28, 2020, the disclosures of which are hereby incorporated by reference.

BACKGROUND

The present application relates generally to engine controls for exhaust aftertreatment thermal management. Internal combustion engine systems may utilize a number of exhaust aftertreatment systems including one or more catalysts to mitigate emissions including particulate, oxides of nitrogen (NOx), and hydrocarbon (HC) emissions. Examples of such catalysts include selective catalytic reduction (SCR) catalysts for mitigating NOX emissions, particulate filters such as diesel particulate filters (DPF) for mitigating particulate emissions, and oxidation catalysts such as diesel oxidation catalysts for oxidizing HC to mitigate HC emissions as well as to provide elevated temperature to downstream aftertreatment system components. In order to achieve desired emissions mitigation, aftertreatment system catalysts typically need to achieve minimum operating temperatures. Aftertreatment system catalysts may also need to achieve minimum regeneration temperatures for catalyst regeneration events which may exceed their minimum operating temperatures. A number of approaches have been proposed for exhaust thermal management to achieve minimum operating temperatures and minimum regeneration temperatures. Existing approaches suffer from a number of disadvantages, drawbacks, and shortcomings. For example, conventional approaches may require equipment such as a DOC, a variable geometry turbocharger (VGT), and/or an exhaust throttle valve (EVT) one or more of which may not be present in certain systems. Other proposals have been made for operating an engine at idle and fueling certain cylinders while applying an engine brake to other cylinders. Even with these approaches, a number of problems exist. For example, the problem of first-catalyst face plugging remains unresolved other than by the replacement of a face-plugged catalyst. Additionally, conventional approaches tend to disrupt desired engine operation or making the approach unviable during engine mission operation (e.g., operation at rated engine speed and/or torque). There remain multiple unmet needs for the unique apparatuses, methods, systems, and techniques disclosed herein.

Disclosure of Example Embodiments

For the purposes of clearly, concisely and exactly describing example embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

Detailed Description of Example Embodiments

Figure 1:
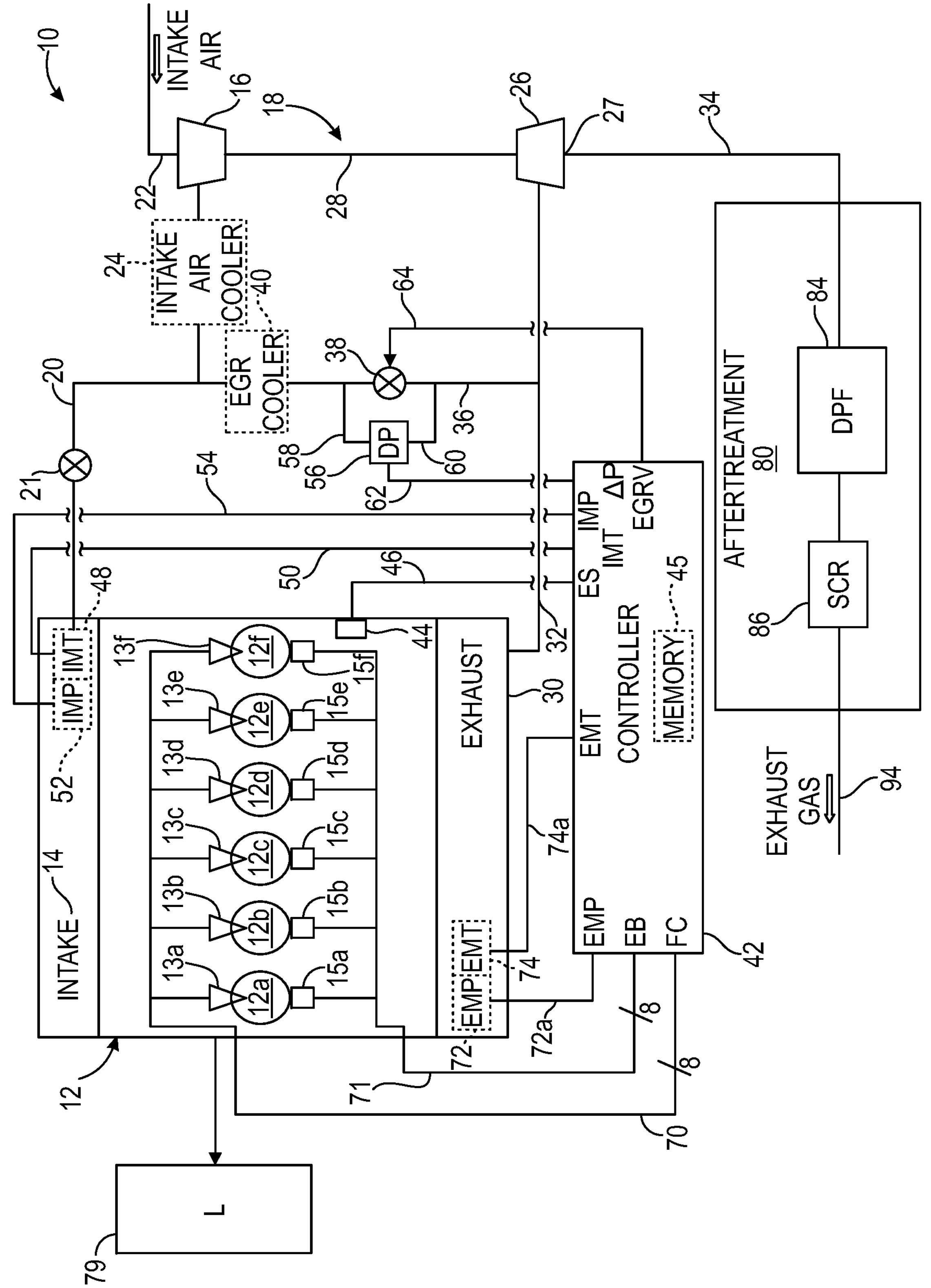
FIG. 1 is a schematic diagram illustrating certain aspects of an example engine system.

With reference to FIG. 1, there are illustrated certain aspects of an example engine system 10. The engine system 10 includes an internal combustion engine 12 (also referred to herein as engine 12) including an intake manifold 14 fluidly coupled to an outlet of a compressor 16 of a turbocharger 18 via an intake conduit 20. Compressor 16 includes a compressor inlet coupled to an intake conduit 22 for receiving fresh air therefrom. The compressor 16 is mechanically coupled to a turbine 26 via a drive shaft 28. The turbine 26 includes a turbine inlet fluidly coupled to an exhaust manifold 30 of engine 12 via an exhaust conduit 32. The engine system 10 may include an intake air cooler 24 disposed in line with intake conduit 20 between compressor 16 and intake manifold 14. The engine system 10 may also include an intake air throttle (IAT) 21.

In the illustrated embodiment the engine 12 is a reciprocating piston, direct injection, compression ignition engine configured to combust diesel fuel. It shall nevertheless be appreciated that the engine 12 may also be provided in other forms including one or more of port injection, spark ignition, and configured to combust other types of fuel such as natural gas or other gaseous fuel or gasoline.

The engine 12 includes a plurality of cylinders 12*a*-12*f* containing respective reciprocating pistons each connected to a crankshaft by a corresponding connecting rod (not shown) to reciprocally move within the respective cylinder 12*a*-12*f* in a standard manner for four-stroke engine operation. Each cylinder 12*a*-12*f* includes a combustion chamber with appropriate intake and exhaust valves (not shown) and fuel injectors 13*a*-13*f*. Fuel injectors 13*a*-13*f* are configured to operate in response to signals from electronic controls described in greater detail hereinafter. Fuel injectors 13*a*-13*f* receive fuel from a fuel source (not shown) in fluid communication therewith.

The engine 12 includes a compression braking system 15 configured to selectably brake at least a first set of the cylinders 12*a*-12*f*. It shall be appreciated that references to braking a set of cylinders in connection with brake fuel operation indicates the braking of one or more of a plurality of cylinders but fewer than all of the plurality of cylinders, for example, the braking of three cylinders of an in-line six-cylinder form of the engine 12 or the braking of four cylinders of each of two banks of cylinders of a V-16 configuration of the engine 12. The compression braking system 15 may include one or more compression brake actuators configured to hold open one or more exhaust valves of one or more of the cylinders 12*a*-12*f* when activated, which more particularly provides a compression braking mode of operation, also referred to as an exhaust brake mode of operation, such that air is pumped in and out of the respective cylinder 12*a*-12*f* through the open valve.

As illustrated in FIG. 1, the compression braking system 15 may include a plurality of brake actuators 15*a*-15*f* individually controllable to provide compression braking of respective ones of the cylinders 12*a*-12*f*. The compression braking system 15 also be provided in other forms. In certain forms, the compression braking system 15 may include a brake actuator configured to provide compression braking for a set of the cylinders 12*a*-12*f*. For example, in forms where the engine 12 is provided in an in-line configuration, the compression braking system 15 may include a single brake actuator configured to provide compression braking for a set of the cylinders 12*a*-12*f*, for example, cylinders 12*a*-12*c*. Alternatively, the compression braking system 15 may include a first brake actuator configured to provide compression braking for a first set of the cylinders 12*a*-12*f* (e.g., cylinders 12*a*-12*c*) and a second brake actuator configured to provide compression braking for a second set of the cylinders 12*a*-12*f* (e.g., cylinders 12*d*-12*f*).

In forms where the engine 12 is provided in V-configuration including first and second cylinder banks, the compression braking system 15 may include a single brake actuator configured to provide compression braking for a set of the cylinders of the first bank and a single brake actuator configured to provide compression braking for a set of the cylinders of the second bank. Alternatively, the compression braking system 15 may include a first brake actuator configured to provide compression braking for a first set of the cylinders of the first bank, a second brake actuator configured to provide compression braking for a second set of the cylinders of the first bank, a third brake actuator configured to provide compression braking for a third set of the cylinders of the second bank, and a fourth brake actuator configured to provide compression braking for a fourth set of the cylinders of the fourth bank.

The engine system 10 includes an EGR valve 38 disposed in-line with an EGR conduit 36 fluidly coupled at one end to intake conduit 20 and at an opposite end to exhaust conduit 32. An EGR cooler 40 may optionally be disposed in-line with EGR conduit 36 between EGR valve 38 and intake conduit 20 as shown in phantom in FIG. 1.

The engine system 10 includes an electronic control system. In the illustrated form the electronic control system includes a controller 42 which may be provided as an electronic control unit (ECU) or an electronic control module (ECM). The electronic control system may further include additional controllers which may be provided as additional ECU or ECM units in communication with one another over a communication network such as a controller area network (CAN).

The controller 42 is generally operable to control and manage operational aspects of engine 12. The Controller 42 includes memory 45 as well as a number of inputs and outputs for interfacing with various sensors and systems coupled to engine 12. The controller 42 can be an electronic circuit comprised of one or more components, including digital circuitry, analog circuitry, or both. The Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or other arrangements. The controller 42 can include signal conditioners, signal format converters (such as analog-to-digital and digital-to-analog converters), limiters, clamps, filters, and the like as needed to perform various control and regulation operations described herein.

The controller 42 may be configured for regulation and control of the overall operation of the engine 12. Alternatively, controller 42 may be configured for regulation and control of a set of controlled aspects of engine 12. The controller 42 is configured to store controller executable instructions and to execute these instructions to provide for regulation and control of the engine 12. These controller executable instructions may be configured in accordance with one or more of the control processes described herein as well as other control processes.

The controller 42 is configured to receive a number of inputs for receiving signals from various sensors or sensing systems associated with the engine system 10. For example, the engine system 10 includes an engine speed sensor 44 electrically connected to an engine speed input, ES, of the controller 42 via signal path 46. Engine speed sensor 44 is operable to sense rotational speed of the engine 12 and produce an engine speed signal on signal path 46 indicative of engine rotational speed. In one embodiment, engine speed sensor 44 is a Hall effect sensor operable to determine engine speed. Alternatively, engine speed sensor 44 may be any other known sensor operable as just described including, but not limited to, a variable reluctance sensor or the like.

The engine system 10 may include an intake manifold temperature sensor 48 disposed in fluid communication with the intake manifold 14 of engine 12, and electrically connected to an intake manifold temperature input (IMT) of the controller 42 via signal path 50. Intake manifold temperature sensor 48 is operable to provide a temperature signal on signal path 50 indicative of the temperature of air charge flowing into the intake manifold 14, wherein the air charge flowing into the intake manifold 14 is generally made up of fresh air supplied by the compressor 16 combined with recirculated exhaust gas supplied by EGR valve 38.

The engine system 10 may include an intake manifold pressure sensor 52 disposed in fluid communication with intake manifold 14 and electrically connected to an intake manifold pressure input (IMP) of the controller 42 via signal path 54. Alternatively, intake manifold pressure sensor 52 may be disposed in fluid communication with intake conduit 20. In any case, intake manifold pressure sensor 52 is operable to produce a pressure signal on signal path 54 indicative of air pressure within intake conduit 20 and intake manifold 14.

The engine system 10 also includes an exhaust manifold pressure sensor 72 disposed in fluid communication with exhaust manifold 30 and electrically connected to an exhaust manifold pressure input (EMP) of the controller 42 via signal path 72*a*. In other forms, exhaust manifold pressure sensor 72 may be disposed in the fluid communication with exhaust conduit 32. In any case, exhaust manifold pressure sensor 72 may be of known construction and is operable to produce a pressure signal on signal path 72*a* indicative of gas pressure within exhaust conduit 32 and exhaust manifold 30. In other forms, one or both of exhaust manifold pressure sensor 72 and exhaust manifold temperature sensor 74 may be absent from the engine system 10, and exhaust pressure and temperature may be calculated or estimated from other parameters. For example, in forms where the exhaust manifold pressure sensor is absent exhaust manifold pressure may be calculated or estimated using a number of techniques or models such as via the speed density equation or by other calculations or estimations.

The engine system 10 may include a differential pressure sensor, or DP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, DP sensor 56 may be coupled across another flow restriction mechanism disposed in-line with EGR conduit 36. In either case, the DP sensor 56 may be of known construction and is electrically connected to a DP input of the controller 42 via signal path 62. DP sensor 56 is operable to provide a differential pressure signal on signal path 62 indicative of the pressure differential across EGR valve 38 or other flow restriction mechanism disposed in-line with EGR conduit 36. Nonetheless, it should be recognized that in other embodiments EGR valve 38, DP sensor 56, and associated conduits, coolers, and the like, may be absent.

The controller 42 is also configured to provide a number of outputs for controlling one or more engine functions associated with the engine system 10. For example, EGR valve 38 is electrically connected to an EGR valve output (EGRV) of controller 42 via signal path 64. The controller 42 is operable, as is known in the art, to produce an EGR valve control signal on signal path 64 to correspondingly control the position of EGR valve 38 relative to a reference position in a known manner. The controller 42 is accordingly operable to control EGR valve 38 to selectively provide a flow of recirculated exhaust gas from exhaust manifold 30 to intake manifold 14. Accordingly, while the composition of gas flowing along pathway 33 changes from (a) compressed air, (b) to an air/fuel charge, and then (c) to exhaust—when EGR valve 38 is closed—such composition may also include various amounts of recirculated exhaust gas when EGR valve 38 is open. In certain embodiments, the controller 42 may also include one or more outputs for controlling operation of a turbocharger mechanism such as a wastegate for turbocharger 18 (if present) a variable geometry actuator (if present).

The controller 42 is further configured to provide a plurality of fueling command outputs for controlling operation of each fuel injector 13*a*-13*f* or to another number of fuel injectors where present in other embodiments and forms of the engine system 10. The signal paths for outputs FC are also collectively designated by reference numeral 70 in FIG. 1; however, it should be understood that the timing of fuel injected by each injector 13*a*-13*f* can be independently controlled with controller 42. In addition to the timing of fuel injection, the controller 42 can also regulate the amount of fuel injected. Typically, the fuel amount varies with the number and duration of injector-activating pulses provided to injectors 13*a*-13*f*.

The controller 42 is configured to provide one or more outputs to activate and deactivate compression brake actuators 15*a*-15*f* or to another number of compression brake actuators where present in other embodiments and forms of the engine system 10. The signal paths for these outputs are collectively designated by reference numeral 71 in FIG. 1; however, it should be understood that the timing and activation of actuators 15*a*-15*f* can be independently controlled with controller 42. In other embodiments, compression brake actuators 15*a*-15*f* are actuatable in sets each numbering more than one. In other embodiments, a different number of compression brake actuators, for example, a single actuator configured to apply engine braking to two or more cylinders, may be controlled with the controller 42.

The controller 42 is configured to coordinate control of fuel injectors fuel injector 13*a*-13*f* (or another number of fuel injectors where present) and compression brake actuators 15*a*-15*f* (or another number of compression brake actuators where present) to provide brake-fuel (B-F) operation of the engine system 10 wherein fuel injectors associated with a first set of cylinders are controlled to provide fuel for and one or more compression brakes associated with a second set of cylinders are controlled to provide compression braking such that the first set of cylinders and the second set of cylinders work at least partially in opposition to one another. It shall be appreciated that B-F operation according to the present disclosure may be provided in connection with a number of unique operating modes to achieve a number of unique operational states of the engine system 10. In certain modes, the controller 42 may control B-F operation of the engine system 10 to provide elevated exhaust temperatures in-mission while minimizing unintended impacts of the performance of the engine system 10.

In certain forms and modes, in-mission B-F operation may be performed while maintaining substantially constant engine speed (e.g., maintaining a rated or predetermined engine speed +/−2.5% or another percentage providing acceptable performance depending on the application and mission in question). Certain such forms may provide substantially constant engine speed while concurrently accommodating and providing substantial variation in engine load (e.g., idle load up to a rated load).

In certain forms and modes, controller 42 may control B-F operation of the engine system 10 to provide elevated exhaust temperatures sufficient for regeneration of a catalyst, for example, regeneration of diesel particulate filter (DPF) 84 described herein or another catalyst. In certain forms and modes, controller 42 may control B-F operation of the engine system 10 to provide elevated exhaust temperatures sufficient for regeneration of a catalyst, such as diesel particulate filter (DPF) 84 during idle-coast operation of a vehicle or during other low load in-mission operating conditions.

In certain forms and modes, controller 42 may control B-F operation of the engine system 10 to provide elevated exhaust temperatures sufficient to reverse first catalyst face plugging which would otherwise require replacement of the catalyst. Such elevated exhaust temperatures may be preferably at least 360 degrees Centigrade or higher, more preferably at least 380 degrees Centigrade or higher, or most preferably at least 400 Centigrade or higher.

The engine system 10 also includes an aftertreatment system 80 providing aftertreatment of exhaust gases before discharge through a conduit 94. During engine operation, exhaust gas flows from turbine outlet 27 through exhaust conduit 34 in fluid communication therewith. Exhaust conduit 34 is also in fluid communication with aftertreatment system 80 which receives the exhaust gas from turbine 26 for aftertreatment. Aftertreatment system 80 can include a number of catalysts configured to chemically convert and/or remove undesirable constituents from the exhaust stream before discharge into the environment. In the illustrated form, aftertreatment system 80 includes a diesel particulate filter (DPF) 84 configured to reduce emissions of particulates. The illustrated form of aftertreatment system 80 also includes a selective catalytic reduction (SCR) catalyst 86 configured to catalyze the reduction of oxides of nitrogen (NOx) in conjunction with a reducing agent such as diesel exhaust fluid (DEF) which is introduced into the exhaust stream by a doser or injector (not shown) typically upstream of the selective catalytic reduction (SCR) 86. In other embodiments, aftertreatment system 80 may include additional or alternative catalysts including, for example, oxidation catalysts and ammonia slip catalysts, and other catalysts as would occur to one of skill in the art with the benefit of the present disclosure.

For nominal operation, the temperature of one or more portions of aftertreatment system 80 may need to achieve certain temperature conditions. For example, the SCR catalyst 86 may need to achieve a minimum temperature in order to operate as intended or desired. Additionally, for certain regeneration modes, even higher temperatures need to be reached from time-to-time. For example, the diesel particulate filter (DPF) 84 may require elevated temperature for periodic regeneration to eliminated accumulated particulate matter.

The engine system 10 is configured to drive a load 79. In some embodiments, the load 79 may be a generator and the engine system 10 may be configured as a generator set. In certain forms of such embodiments, the engine system 10 may be configured to operate at a predetermined or rated speed effective to provide AC output from the generator at a desired frequency, e.g., 50 Hz or 60 Hz. In some embodiments, the engine system 10 may be configured to propel a vehicle and the load L may be a propulsion load imposed on a driveline operatively coupled with the engine system 10 including a number of load components such as aerodynamic resistance, rolling resistance, and grade/gravitational resistance to name several examples. The driveline operatively coupled with the engine system 10 may include, for example, a transmission, a drive shaft, a differential, and drive wheels.

Figure 2:
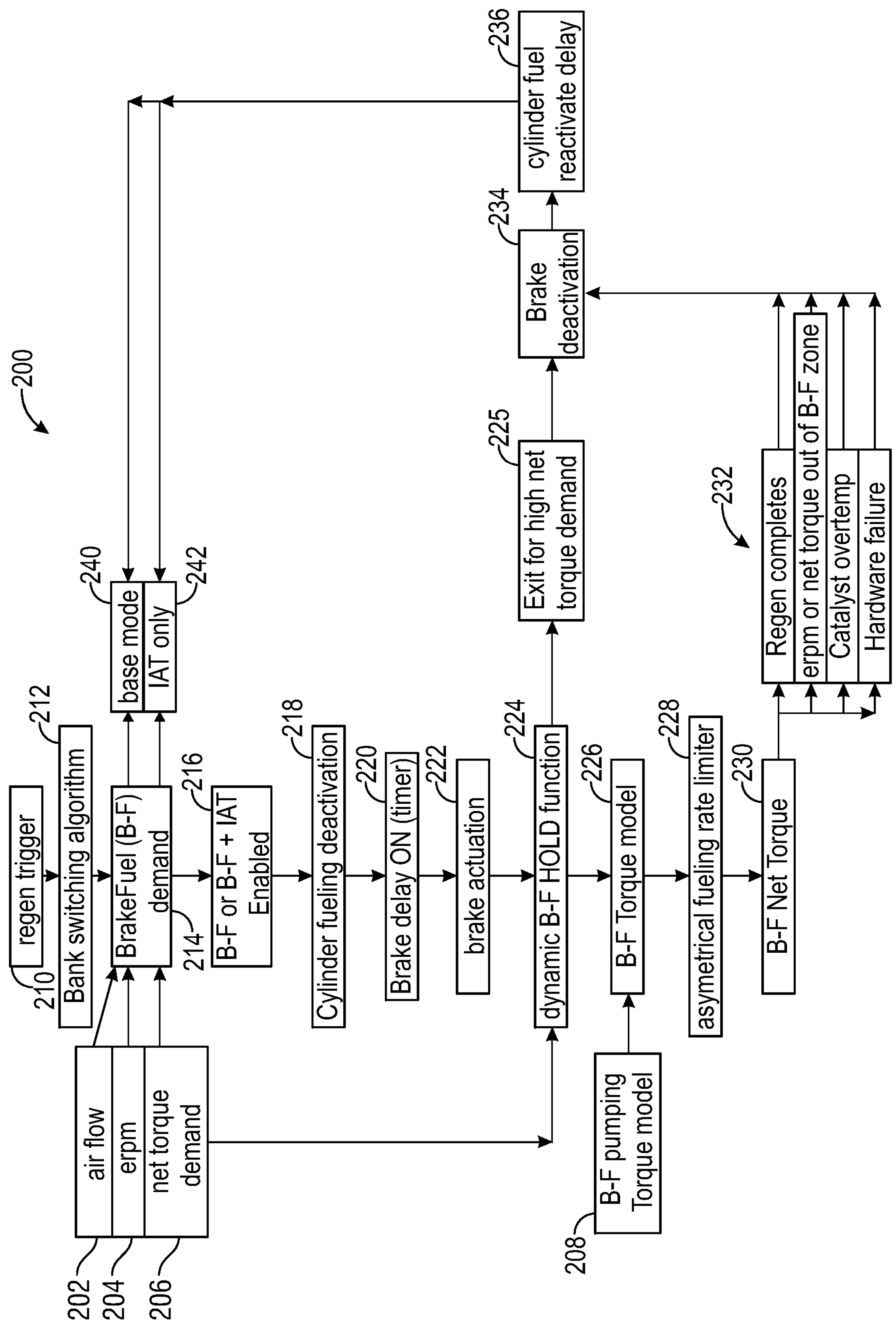
FIG. 2 is a flow diagram illustrating certain aspects of an example control process.

With reference to FIG. 2 there is illustrated an example control process 200 (also referred to herein as process 200) which may be implemented and executed in connection with one or more components of an electronic control system associated with an engine system, for example, the controller 42 of the engine system 10 described in connection with FIG. 1 or one or more alternative or additional components of an electronic control system. For purposes of illustration, process 200 is described in connection with a generator set form of the engine system 10. It shall nevertheless be appreciated that process 200 may be utilized in connection with any of the forms or variations of the engine system 10 disclosed herein as well as with other engine system forms and variations.

Process 200 may be initiated at block 210 when a regeneration trigger condition is set or determined to be true. The regeneration trigger condition may be set or determined to be true in response to a number of conditions or evaluations including, for example, a timer or counter condition indicating a time or count threshold for triggering regeneration of a catalyst, a catalyst model condition indicating a state of the catalyst for triggering regeneration of a catalyst, or combinations of these and/or various other techniques as would occur to one of skill in the art with the benefit of the present disclosure. In certain forms, process 200 may be performed with the engine system 10 operating at and maintaining a predetermined engine speed, such as at a rated engine speed, or a predetermined engine speed range, such as a rated engine speed plus or minus a percentage (e.g. +/−2.5% or another percentage providing acceptable performance depending on the application and mission in question). In some applications, maintaining a predetermined engine speed or speed range may be a control priority. One such example is where engine system 10 is provided in the form of a generator set that is required to operate at a given speed in order to match power generation frequency with that of a grid or load system coupled with the generator set. From block 210, process 200 proceeds to block 212.

Block 212 performs a cylinder variation operation (e.g., execution of a bank switching algorithm or a cylinder set switching algorithm) which varies the selected ones of a plurality of cylinders that are operated to provide negative torque via compression braking and those that are operated to provide positive torque via fueling and combustion. In certain forms, block 212 may alternate between one of first a set of cylinders and a second set of cylinders providing positive torque with the other set providing negative torque on successive operations of process 200. In certain forms, block 212 may alternate between one of a first set of cylinders and a second set of cylinders providing positive torque with the other set providing negative torque by monitoring the duration of B-F operation and alternating at a predetermined operation duration. While block 212 may be omitted, as may other blocks of process 200 or sub-components thereof, the inventors have determined that unanticipated results may be obtained by including block 212. For example, the inventors have determined that cylinder variation such as provided by block 212 mitigates certain failure modes in which one set of cylinders is not broken in or wears unevenly as compared to another set of cylinders. From block 212, process 200 proceeds to block 214.

Block 214 performs a brake-fuel (B-F) demand evaluation in response to air flow input 202, engine speed input 204, and net torque demand input 206. Air flow input 202 provides an indication of intake air flow which may be determined, for example, based on a calculation, model, sensor output, or a combination thereof. Engine speed input 204 provides an indication of engine speed which may be determined, for example, based on the output of an engine speed sensor. Net torque demand input 206 provides an indication of the net torque output demanded from the engine and may be determined, for example, in response to an operator or control system demand. In the context of a generator set form of the engine system 10, net torque demand input 206 may be established in response to the electrical load demanded of the generator set. In the context of a vehicle propulsion form of the engine system 10, net torque demand input 206 may be established in response to operator and control system demands (e.g., accelerator pedal position, cruise control system demand, and/or other vehicle system demands). Block 214 evaluates whether and under what conditions a regeneration target temperature can be achieved based on the received values of air flow input 202, engine speed input 204, and net torque demand input 206. The regeneration target temperature may be a target for an exhaust temperature, a catalyst temperature, or another temperature that can serve as an indicator or proxy indicating conditions under which regeneration can be performed.

Figure 6:
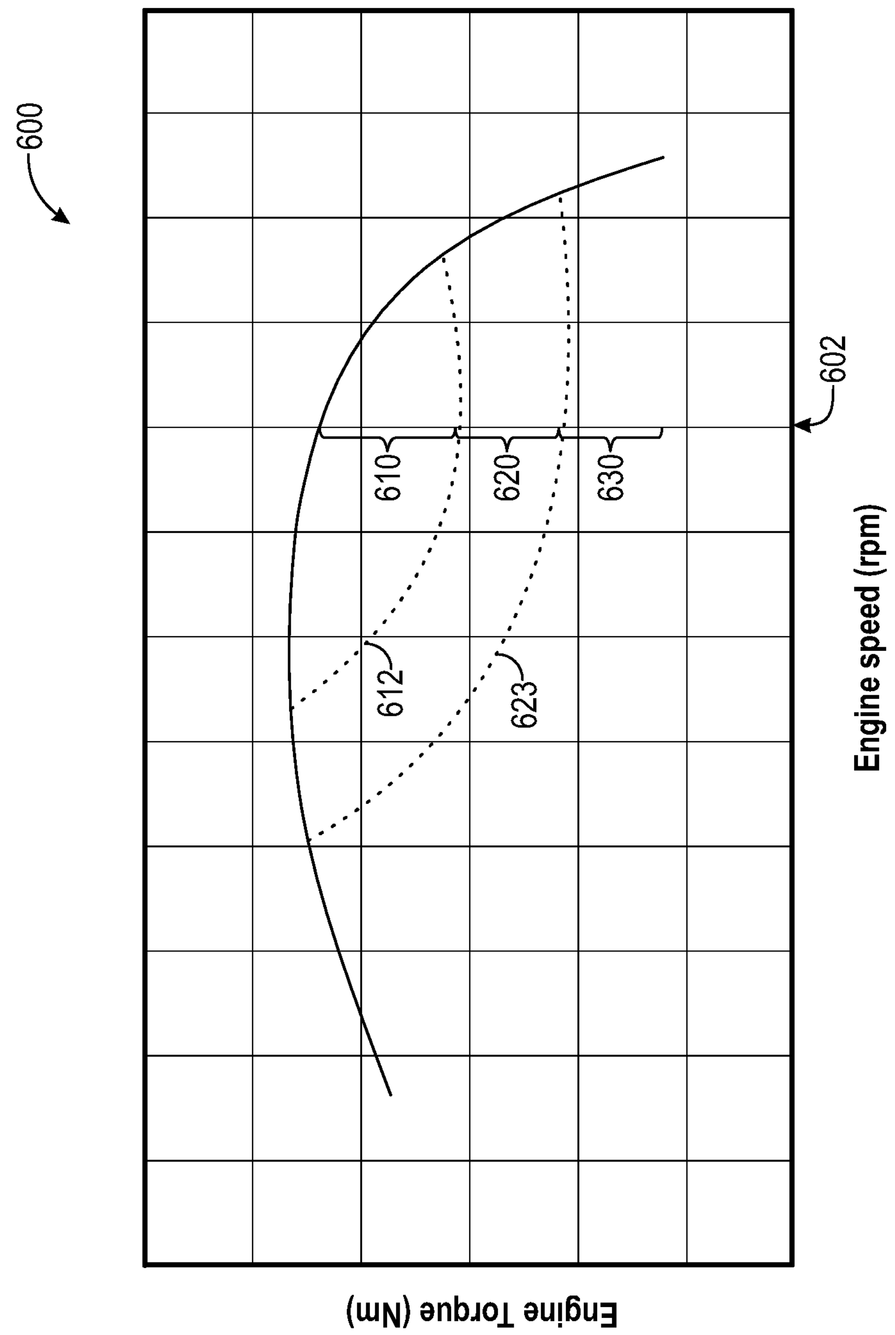
FIG. 6 is a graph illustrating certain aspects of an example engine system operating map.

Block 214 may utilize an engine operating map in evaluating whether and under what conditions a regeneration target temperature can be achieved. FIG. 6 illustrates an example engine operating map 600 with engine speed (rpm) on its horizontal axis, and engine torque (Nm) on its vertical axis. Engine operating map 600 includes a plurality of operating regions. At a predetermined engine speed 602 (e.g., a rated engine operating speed), engine torques range 610, 620, and 630 may be utilized by block 214 in determining whether and under what conditions a regeneration target temperature can be achieved. In engine torque range 610, the regeneration target temperature can be achieved without operating an intake air throttle (IAT) and without brake-fuel (B-F) operation. In engine torque range 620, the regeneration target temperature can be achieved by operating the IAT) without B-F operation. In engine torque range 630, the regeneration target temperature can be achieved with B-F operation either with or without operating the IAT.

Block 214 may utilize different engine operating maps in response to variation in the parameters indicated by block 210. For example, block 210 may include parameters indicating a first type of regeneration such as a standard regeneration of a DPF which may have first temperature requirements and may be evaluated relative to a first operating engine operating map which is tuned to the first temperature requirements. Block 210 may include parameters indicating a second type of regeneration such as a first catalyst face plugging which may have second temperature requirements greater than the first temperature requirements and may be evaluated relative to a second operating engine operating map which is tuned to the second temperature requirements.

Block 210 may include parameters indicating other types of regenerations such as de-Coke operation or desorb operation which may have other temperature requirements and may be evaluated relative to additional or alternative operating engine operating maps which are tuned to their temperature requirements. De-Coke operation includes operation configured or effective to mitigate or reverse catalyst coking which can occur at lower exhaust gas temps (e.g., ~180-275 C). De-coke operation may be facilitated, for example, by exhaust temperatures greater than 275 C or by exhaust temperatures greater than 300 C. Desorb operation includes operation configured or effective to mitigate or reverse the accumulation of hydrocarbons which in an SCR catalyst which can impede its operation by occupying space or sites that would otherwise be available for de-NOx. Desorb operation may also include operation configured and effective to mitigate or reverse the accumulation of urea deposits that have the effect of impeding its operation or efficiency of the SCR catalyst. De-coke operation may be facilitated, for example, by exhaust temperatures greater than 275 C or by exhaust temperatures greater than 300 C.

It shall be appreciated that certain embodiments may utilize a combined de-Coke and desorb regeneration. For example, a catalyst de-Coke process may be provided with and triggered by a catalyst desorb process. In such embodiments, operation less than a threshold temperature (e.g., 250 C) for a threshold time or duration may initiate regeneration to burn off hydrocarbons accumulated in a catalyst in a desorb manner preempting hydrocarbons from reaching a level that would eventually lead to coking of the catalyst.

It shall be further appreciated that block 210 may include parameters indicating other types of temperature requirements, for example, temperature requirements for nominal operation of an SCR catalyst, which shall be understood as analogous to a catalyst regeneration trigger in the context of process 200, may be evaluated relative to another operating engine operating map which is tuned to the SCR catalyst temperature requirements.

A number of additions to and variations of engine operating map 600 are contemplated. In embodiments that do not include an IAT, for example, engine torque ranges 620 and 630 may define a range wherein the regeneration target temperature can be achieved with B-F operation. In some embodiments, engine torque range 630 may be subdivided into a first sub-range wherein the regeneration target temperature can be achieved with B-F operation alone and a second sub-range wherein the regeneration target temperature can be achieved with B-F operation in combination with IAT operations. In some embodiments, such as generator set applications which are required to operate at a substantially constant speed, engine torque ranges may be established only for a rated engine speed or only for a rated engine speed band or range. In some embodiments, such as transportation applications which are required to operate at a variety of engine speeds, engine torque ranges may be established over a greater range of engine speeds, for example, as indicated by curves 612 and 614 illustrated in graph 600 wherein curve 612 indicates a boundary between engine torque ranges 610 and 620 over an extended engine speed range and curve 614 indicates a boundary between engine torque ranges 620 and 630 over an extended engine speed range. In some embodiments, the engine torque ranges may be predetermined values. In some embodiments, such engine torque ranges may be dynamically determined. In some embodiments, such engine torque ranges may further be established by empirical data, modeling, theory-based calculation or combinations thereof.

If block 214 evaluates that the regeneration target temperature can be achieved without operating the IAT and without B-F operation (e.g., the engine is operating in engine torque range 610), process 200 proceeds to block 240 which operates the engine accordingly to provide the regeneration target temperature and perform the regeneration. From block 240, process 200 may repeat or end and may be later initiated, for example, in the manner described above in connection with block 210.

If block 214 evaluates that the regeneration target temperature can be achieved by operating the IAT without B-F operation (e.g., the engine is operating in engine torque range 620), process 200 proceeds to block 242 which operates the engine accordingly to provide the regeneration target temperature and perform the regeneration. From block 240, process 200 may repeat or end and may be later initiated, for example, in the manner described above in connection with block 210.

If block 214 evaluates that the regeneration target temperature can be achieved with B-F operation alone or by a combination of B-F operation and operation of the IAT (e.g., the engine is operating in engine torque range 630), process 200 proceeds to block 216 which operates the engine accordingly to provide the regeneration target temperature and perform the regeneration. From block 216, process 200 proceeds to block 218.

Block 218 deactivates fueling for a set of cylinders selected in connection with block 212. From block 218, process 200 proceeds to block 220 which provides a delay to subsequent operations. In some forms, block 220 may provide a delay to allow the engine system 10 to respond to prior control commands which may provide benefits for reduction of noise, vibration, and harshness (NVH) In some forms, block 220 and its associated may be omitted or may be calibrated to provide zero delay. From block 220, process 200 proceeds to block 222 which activates compression braking for another set of cylinders selected in connection with block 212. From block 220, process 200 proceeds to block 224.

Block 224 performs a dynamic B-F hold function which controls B-F operation in response to the net torque demand input 206. If block 224 determines that the net torque demand input 206 exceeds a maximum value, process 200 proceeds to block 225 which initiates an exit from B-F operation for high net torque demand and proceeds to block 234. If block 224 determines that the net torque demand input 206 does not exceed a maximum value, process 200 proceeds to block 226 which controls B-F operation in response to a B-F pumping torque model 208 as well as the net torque demand input 206. B-F pumping torque model 208 may be configured to provide an indication of the negative torque generated by the first set of cylinders which are controlled to provide compression braking. Block 226 determines and outputs one or more B-F fueling control parameters which are configured to provide net torque from the engine system 10 corresponding to the value of net torque demand input 206 while accounting for the negative torque value indicated by B-F pumping torque model 208.

The output of block 226 is provided to fueling rate limiter block 228 which preferably provides an asymmetric fueling rate limits including a first limit for fueling rate increases and a second limit differing from the first limit for fueling rate decreases. In certain forms, the first limit may be set such that no rate limit is imposed on fueling rate increases and the second limit may be set to a value empirically determined to limit fueling rate decreases to provide a reduction or mitigation of one or more NVH metrics. In certain forms, the first limit and the second limit may both be set to values empirically determined to limit fueling rate decreases to provide a reduction or mitigation of one or more NVH metrics. Such values may be asymmetric or different or in certain forms may be the same. In certain forms the reduction or mitigation of one or more NVH metrics may be balanced or offset by a transient demand response criterion, for example, to provide at least a minimum level of responsiveness to torque demand increases. In certain forms, the first limit and the second limit may be set such that no rate limit is imposed on fueling rate increases and no rate limit is imposed on fueling rate decreases or fueling rate limiter block 228 may be omitted.

The output of fueling rate limiter block 228 (or the output of block 226 if block 228 is omitted) is provided to B-F net torque block 230 which establishes operation to provide net torque from the engine system 10 corresponding to the value of net torque demand input 206 while accounting for the negative torque value indicated by B-F pumping torque model 208 and one or more associated B-F fueling values to provide such operation. From block 230, process 200 proceeds to blocks 232 which evaluates one or more conditions for ending or transitioning out B-F operation. In the illustrated form, blocks 232 are configured to evaluate or determine whether a regeneration event has ended or is complete (e.g., as may be indicated by a change in the value of block 210), whether an engine speed or net torque has changed to an operating map region or zone outside of a B-F operation region or zone, whether a catalyst maximum temperature or temperature condition has been exceeded, and whether a hardware malfunction or failure has occurred (e.g., a failure or malfunction of compression braking equipment). If blocks 232 evaluate or determine that any of the foregoing conditions have been met, process 200 proceeds to block 234 which deactivates compression braking of the first set of cylinders, and then proceeds to block 236 which provides a delay after which reactivation of fueling to the first set of cylinders is performed. From block 236, process 200 proceeds to block 240 if the engine system 10 is operating in an engine map region which calls for base mode operation or to block 242 if the engine system 10 is operating in an engine map region which calls for TAT only mode operation.

Figure 3:
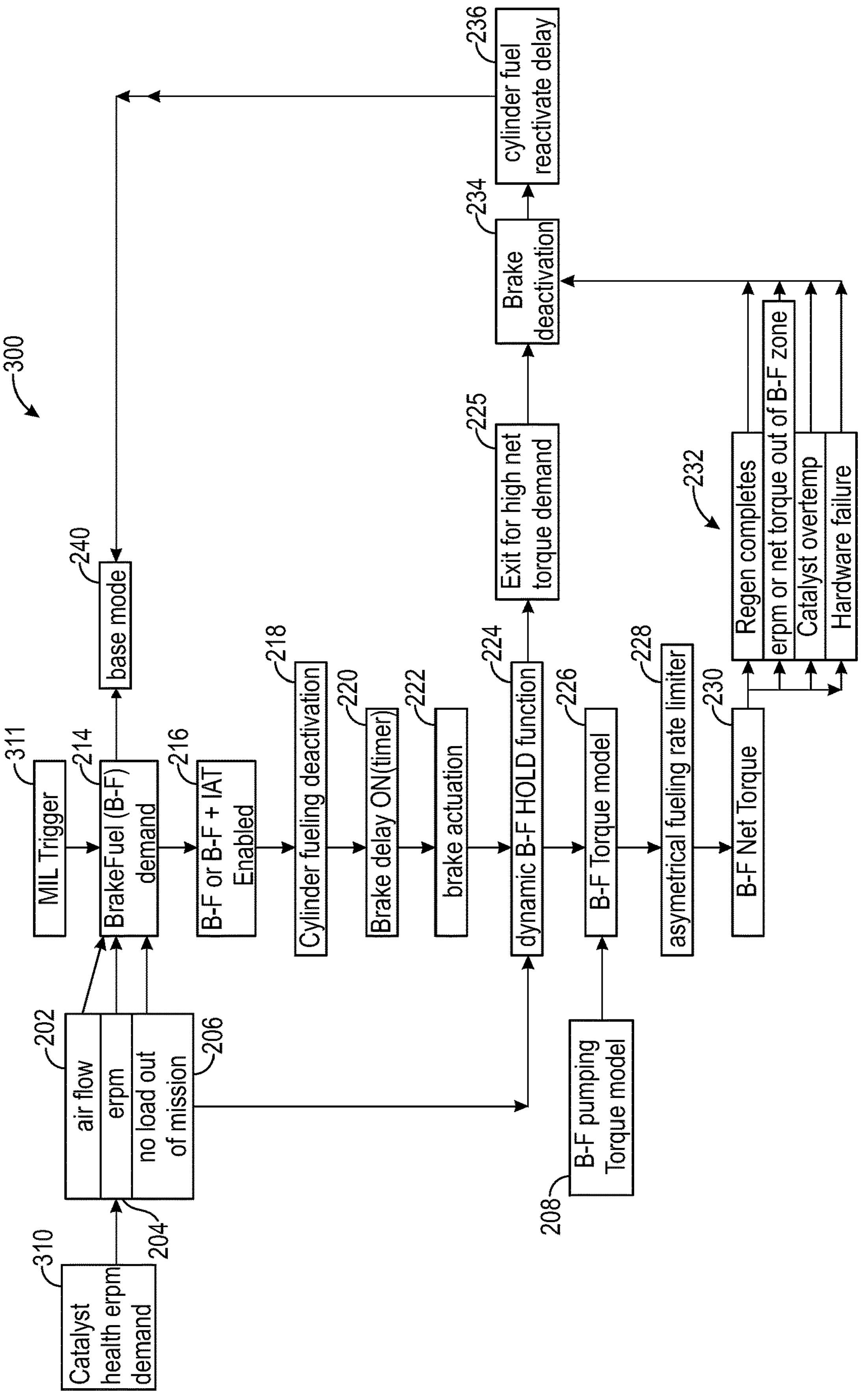
FIG. 3 is a flow diagram illustrating certain aspects of an example control process.

With reference to FIG. 3 there is illustrated an example control process 300 (also referred to herein as process 300) which may be implemented and executed in connection with one or more components of an electronic control system associated with an engine system, for example, the controller 42 of the engine system 10 described in connection with FIG. 1. Process 300 includes a number of blocks and associated logic and operations that are substantially the same as or similar to the blocks, logic, and operations of process 200 and that are designated with the same reference numerals used in connection with process 200. It shall be appreciated, that certain variations in such blocks of process 300 and their interaction and combined operation are also contemplated as described below. Process 300 also includes a number of blocks and associated logic and operations that are distinct from those of process 200 and are denoted with different reference numerals as described below. For purposes of illustration, process 300 is described in connection with a stationary service or maintenance event of a vehicle propulsion system form of the engine system 10. It shall nevertheless be appreciated that process 200 may be utilized in connection with any of the forms or variations of the engine system 10 disclosed herein as well as with other engine system forms and variations.

In contrast to process 200, process 300 may be initiated at block 311 when a malfunction indicator lamp (MIL) condition is present. The MIL condition may be triggered, for example, by a sensor and/or a model indicating a catalyst malfunction condition, such as a first catalyst face plugging condition or another type of catalyst malfunction. The MIL condition may have an associated catalyst health engine speed demand which is configured to provide an exhaust temperature to restore catalyst health, for example, elevated exhaust temperatures sufficient to reverse first catalyst face plugging which would otherwise require replacement of the catalyst. Such elevated exhaust temperatures may be preferably at least 360 degrees Centigrade or higher, more preferably at least 380 degrees Centigrade or higher, or most preferably at least 400 Centigrade or higher. In certain forms, provision of such elevated exhaust temperatures may be restricted to stationary vehicle operating conditions such as a service event initiated by an operator or technician, for example, by pressing a button or otherwise providing an input with the vehicle stationary and operating at idle speed. Accordingly, net torque demand input 206 may be a no-load, out of mission, or idle net torque demand and may be so restricted. Additionally, IAT-only operation provided by block 242 in process 200 may be omitted from consideration in cases where IAT-only operation is not capable of meeting the necessary exhaust temperature.

Figure 4:
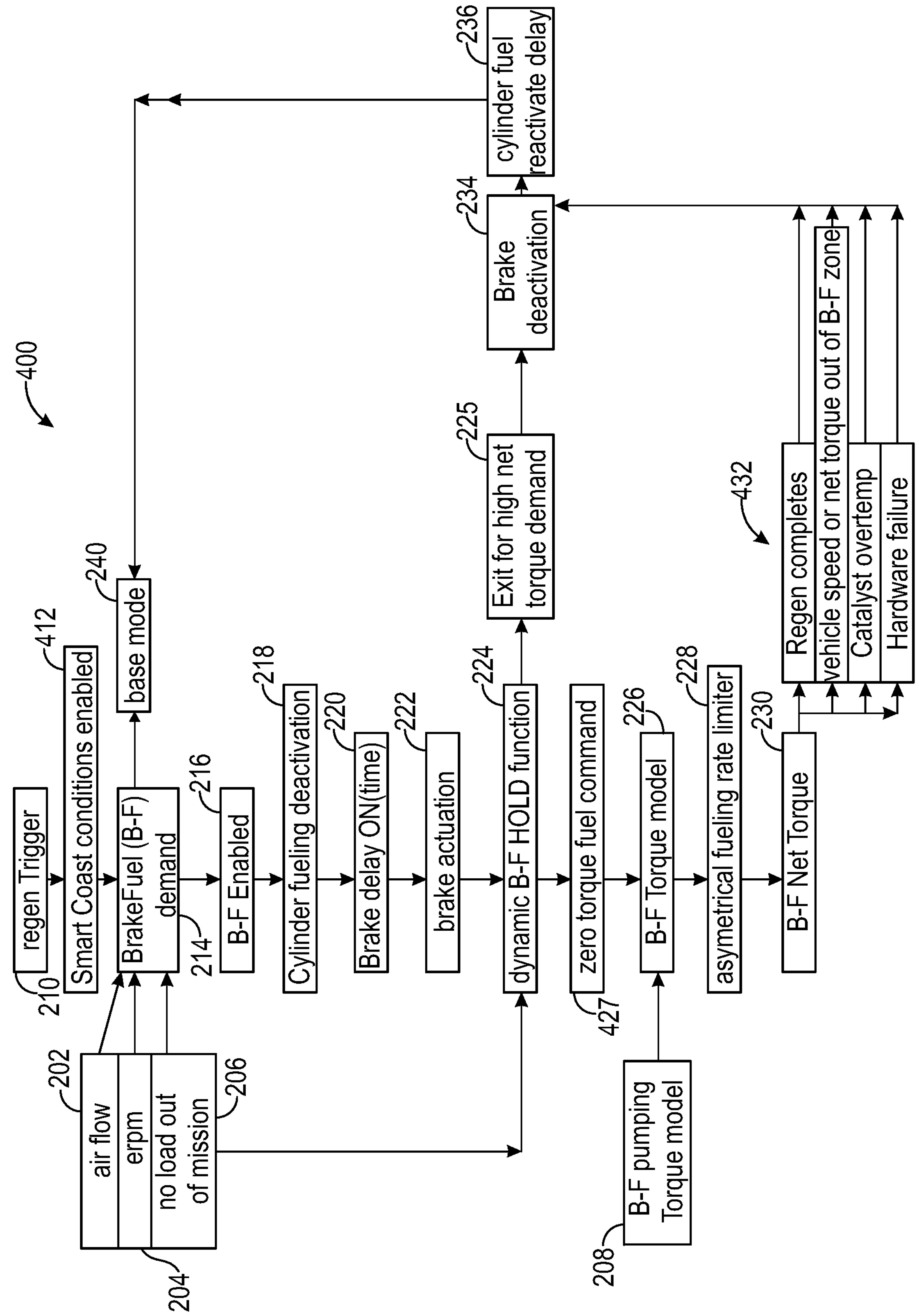
FIG. 4 is a flow diagram illustrating certain aspects of an example control process.

With reference to FIG. 4 there is illustrated an example control process 400 (also referred to herein as process 400) which may be implemented and executed in connection with one or more components of an electronic control system associated with an engine system, for example, the controller 42 of the engine system 10 described in connection with FIG. 1. Process 400 includes a number of blocks and associated logic and operations that are substantially the same as or similar to the blocks, logic, and operations of process 200 and that are designated with the same reference numerals used in connection with process 200. It shall be appreciated, that certain variations in such blocks of process 500 and their interaction and combined operation are also contemplated as described below. Process 400 also includes a number of blocks and associated logic and operations that are distinct from those of process 200 and are denoted with different reference numerals as described below. For purposes of illustration, process 400 is described in connection with idle coast operation (e.g., smart coast operation) of a vehicle propulsion system form of the engine system 10. It shall nevertheless be appreciated that process 200 may be utilized in connection with any of the forms or variations of the engine system 10 disclosed herein as well as with other engine system forms and variations.

In contrast to process 200, process 400 includes idle coast conditions enabled block 412 which evaluates whether the conditions permitting idle coast operation are present (e.g., the vehicle is coasting down a hill) or whether the system is operating in an idle coast operation. Additionally, process 400 includes a zero net torque fueling command 427 which is configured to control compression braking to provide zero net torque based on net torque demand input 206. It shall be appreciated that zero net torque fueling command 427 is configured to avoid interference with idle coast operation that would occur with a positive or negative net torque. Process 400 also includes block set 432 which evaluates one or more conditions for ending or transitioning out B-F operation. In the illustrated form blocks 432 are configured to evaluate or determine whether a regeneration event has ended or is complete (e.g., as may be indicated by a change in the value of block 210), whether a vehicle speed or net torque has changed to an operating map region or zone outside of a B-F operation region or zone, whether a catalyst maximum temperature or temperature condition has been exceeded, and whether a hardware malfunction or failure has occurred (e.g., a failure or malfunction of compression braking equipment).

Figure 5:
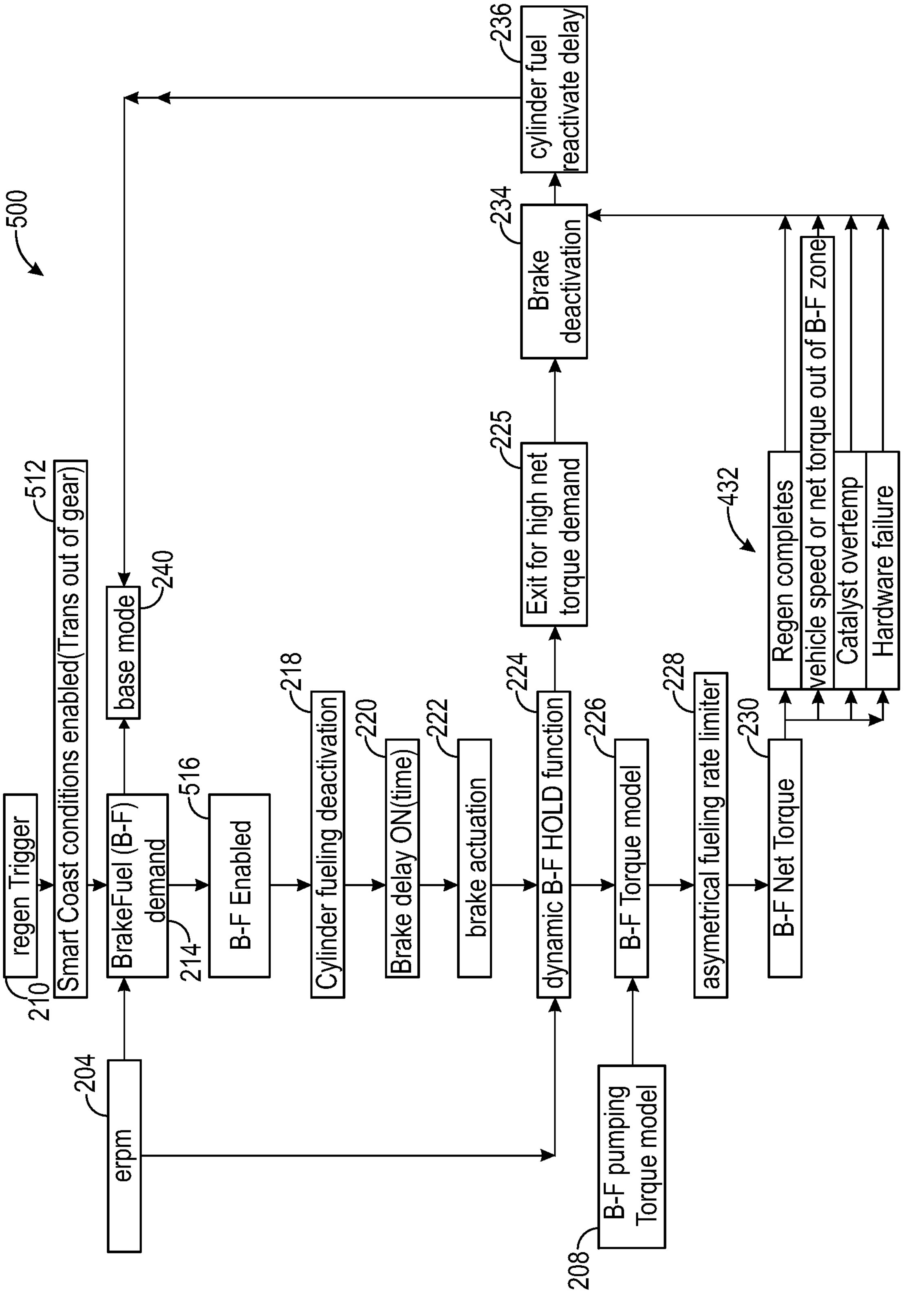
FIG. 5 is a flow diagram illustrating certain aspects of an example control process.

With reference to FIG. 5 there is illustrated an example control process 500 (also referred to herein as process 500) which may be implemented and executed in connection with one or more components of an electronic control system associated with an engine system, for example, the controller 42 of the engine system 10 described in connection with FIG. 1. Process 500 includes a number of blocks and associated logic and operations that are substantially the same as or similar to the blocks, logic, and operations of process 200 and that are designated with the same reference numerals used in connection with process 200. It shall be appreciated, that certain variations in such blocks of process 500 and their interaction and combined operation are also contemplated as described below. Process 500 also includes a number of blocks and associated logic and operations that are distinct from those of process 200 and are denoted with different reference numerals as described below. For purposes of illustration, process 500 is described in connection with idle coast operation of a vehicle propulsion system form of the engine system 10. It shall nevertheless be appreciated that process 200 may be utilized in connection with any of the forms or variations of the engine system 10 disclosed herein as well as with other engine system forms and variations.

In contrast to process 200, process 500 includes idle coast conditions enabled block 512 which evaluates whether the conditions permitting idle coast operation are present (e.g., the vehicle is coasting down a hill and the transmission is out of gear) or whether the system is operating in an idle coast operation. Additionally, process 500 may utilize only engine speed input 204 while omitting air flow input 202, net torque demand input 206, and zero net torque fueling command 427. Process 500 also includes block set 432 which evaluates one or more conditions for ending or transitioning out B-F operation. In the illustrated form blocks 432 are configured to evaluate or determine whether a regeneration event has ended or is complete (e.g., as may be indicated by a change in the value of block 210), whether a vehicle speed or net torque has changed to an operating map region or zone outside of a B-F operation region or zone, whether a catalyst maximum temperature or temperature condition has been exceeded, and whether a hardware malfunction or failure has occurred (e.g., a failure or malfunction of compression braking equipment).

A number of example embodiment shall be further described. A first example embodiment is a method comprising: providing an engine system configured for vehicle propulsion and including a plurality of cylinders, a plurality of fuel injectors configured to provide fuel to respective ones of the plurality of cylinders, a compression brake coupled with at least a first set of the plurality of cylinders, an exhaust aftertreatment system including a catalyst; operating the engine in an idle coast mode wherein the engine is decoupled from the road load; determining a condition for regeneration of the catalyst; in response to the act of determining, transitioning operating the engine to a brake-fuel mode wherein the compression brake is actuated to provide compression braking of the first set of the plurality of cylinders and a second set of the plurality of cylinders receive and combust fuel provided from respective ones of the plurality of fuel injectors; wherein the act of transitioning occurs while maintaining the idle coast mode. In some forms of the first example embodiment, the brake-fuel mode determines a fueling command in response only to an engine speed input. In some forms of the first example embodiment, the act of transitioning includes controlling changes in fueling rate using a fueling rate limiter that is asymmetric for increases and decreases in fueling rate. In some forms of the first example embodiment, the act of determining a condition for regeneration of the catalyst includes determining a condition for regeneration of a diesel particulate filter.

A second example embodiment is an engine system comprising: an engine configured for vehicle propulsion and including a plurality of cylinders; a plurality of fuel injectors configured to provide fuel to respective ones of the plurality of cylinders; a compression brake coupled with at least a first set of the plurality of cylinders; an exhaust aftertreatment system including a catalyst; and an electronic control system configured to: operate the engine in an idle coast mode wherein the engine is decoupled from the road load; determine a condition for regeneration of the catalyst; and in response to the condition for regeneration of the catalyst, transition operation of the engine to a brake-fuel mode wherein the compression brake is actuated to provide compression braking of the first set of the plurality of cylinders and a second set of the plurality of cylinders receive and combust fuel provided from respective ones of the plurality of fuel injectors; wherein the transition occurs while maintaining the idle coast mode. In some forms of the second example embodiment, the brake-fuel mode utilizes a zero net torque fueling command in response to a net torque demand of the engine. In some forms of the second example embodiment, the transition includes controlling changes in fueling rate using a fueling rate limiter that is asymmetric for increases and decreases in fueling rate. In some forms of the second example embodiment, the condition for regeneration of the catalyst includes determining a need for regeneration of a diesel particulate filter.

A third example embodiment is a method comprising: providing an engine system including a plurality of cylinders, a plurality of fuel injectors configured to provide fuel to respective ones of the plurality of cylinders, a compression brake coupled with at least a first set of the plurality of cylinders, an exhaust aftertreatment system including a catalyst; operating the engine in a first mode wherein the engine operates at a rated speed and a light load being 50% or less than a rated torque with the plurality of fuel injectors providing fuel to each of the plurality of cylinders; determining a condition for regeneration of the catalyst; and in response to the act of determining, transitioning operating the engine to a brake-fuel mode wherein the compression brake is actuated to provide compression braking of the first set of the plurality of cylinders and a second set of the plurality of cylinders receive and combust fuel provided from respective ones of the plurality of fuel injectors; wherein the act of transitioning maintains operation of the engine at a predetermined speed or in a predetermined speed range. In some forms of the third example embodiment, the act of transitioning maintains operation of the engine at the rated speed plus or minus 2.5% or less. In some forms of the third example embodiment, the act of transitioning includes controlling changes in fueling rate using a fueling rate limiter that is asymmetric for increases and decreases in fueling rate. In some forms of the third example embodiment, the act of determining a condition for regeneration of the catalyst includes determining a condition for regeneration of a diesel particulate filter. In some forms of the third example embodiment, the act of determining a condition for regeneration of the catalyst includes determining a need for mitigation of a first catalyst face plugging condition.

A fourth example embodiment is an engine system comprising: an engine including a plurality of cylinders; a plurality of fuel injectors configured to provide fuel to respective ones of the plurality of cylinders; a compression brake coupled with at least a first set of the plurality of cylinders; an exhaust aftertreatment system including a catalyst; and an electronic control system configured to: operate the engine in a first mode wherein the engine operates at a rated speed and a light load being 50% or less than a rated torque with the plurality of fuel injectors providing fuel to each of the plurality of cylinders; determine a condition for regeneration of the catalyst; and in response to a condition for regeneration, transition operation of the engine to a brake-fuel mode wherein the compression brake is actuated to provide compression braking of the first set of the plurality of cylinders and a second set of the plurality of cylinders receive and combust fuel provided from respective ones of the plurality of fuel injectors, wherein during the transition the electronic control system maintains operation of the engine at a predetermined speed or in a predetermined speed range. In some forms of the fourth example embodiment, during the transition the electronic control system maintains operation of the engine at the rated speed plus or minus 2.5% or less. In some forms of the fourth example embodiment, during the transition the electronic control system controls changes in fueling rate using a fueling rate limiter that is asymmetric for increases and decreases in fueling rate. In some forms of the fourth example embodiment, the electronic control system is configured to determine a condition for regeneration of a diesel particulate filter. In some forms of the fourth example embodiment, the electronic control system is configured to determine a need for mitigation of a first catalyst face plugging condition.

A fifth example embodiment is a method comprising: operating an engine system including a plurality of cylinders, a plurality of fuel injectors configured to provide fuel the plurality of cylinders, a compression braking system configured to selectably brake at least a first set of the plurality of cylinders, and an exhaust aftertreatment system including at least one catalyst; determining occurrence of a face plugging condition of the at least one catalyst; in response to the act of determining, operating the engine in a brake-fuel mode wherein the compression brake is actuated to provide compression braking of the first set of the plurality of cylinders and a second set of the plurality of cylinders receives and combust fuel provided from respective ones of the plurality of fuel injectors; and in the brake-fuel mode controlling braking of the first set of the plurality of cylinders and fueling of the second set of the plurality of cylinders such that the engine system outputs exhaust at a temperature effective to mitigate the face plugging condition of the at least one catalyst. In some forms of the fifth example embodiment, the temperature effective to mitigate the face plugging condition of the at least one catalyst is 360 degrees Centigrade or higher. In some forms of the fifth example embodiment, the temperature effective to mitigate the face plugging condition of the at least one catalyst is 380 degrees Centigrade or higher. In some forms of the fifth example embodiment, the temperature effective to mitigate the face plugging condition of the at least one catalyst is 400 degrees Centigrade or higher. In some forms of the fifth example embodiment, the method is performed with the engine system in a stationary or out of mission operating condition.

A sixth example embodiment is an engine system comprising: an engine including a plurality of cylinders; a plurality of fuel injectors configured to provide fuel to respective ones of the plurality of cylinders; a compression brake coupled with at least a first set of the plurality of cylinders; an exhaust aftertreatment system including a catalyst; and an electronic control system configured to: determine occurrence of a face plugging condition of the at least one catalyst, and in response to the occurrence of a face plugging condition, operate the engine in a brake-fuel mode wherein the compression brake is actuated to provide compression braking of the first set of the plurality of cylinders and a second set of the plurality of cylinders receives and combust fuel provided from respective ones of the plurality of fuel injectors, wherein operation of the engine in a brake-fuel mode in the brake-fuel mode provides engine exhaust at a temperature effective to mitigate the face plugging condition of the at least one catalyst. In some forms of the sixth example embodiment, the temperature effective to mitigate the face plugging condition of the at least one catalyst is 360 degrees Centigrade or higher. In some forms of the sixth example embodiment, the temperature effective to mitigate the face plugging condition of the at least one catalyst is 380 degrees Centigrade or higher. In some forms of the sixth example embodiment, the temperature effective to mitigate the face plugging condition of the at least one catalyst is 400 degrees Centigrade or higher. In some forms of the sixth example embodiment, the electronic control system is configured to operate the engine in a brake-fuel mode only with the engine system in a stationary operating condition.

A seventh example embodiment is a method comprising: operating an engine system including a plurality of cylinders, a plurality of fuel injectors configured to provide fuel the plurality of cylinders, a compression braking system configured to selectably brake at least a first set of the plurality of cylinders, and an exhaust aftertreatment system including at least one catalyst; determining occurrence of a face plugging condition of the at least one catalyst; in response to the act of determining, operating the engine in a brake-fuel mode wherein the compression brake is actuated to provide compression braking of the first set of the plurality of cylinders and a second set of the plurality of cylinders receives and combust fuel provided from respective ones of the plurality of fuel injectors; and in the brake-fuel mode controlling braking of the first set of the plurality of cylinders and fueling of the second set of the plurality of cylinders such that the engine system outputs exhaust at a temperature effective to provide one or both of de-Coke operation and desorb operation for the at least one catalyst. In some forms of the seventh example embodiment, the temperature effective to provide one or both of de-Coke operation and desorb operation is 275 degrees Centigrade or higher. In some forms of the seventh example embodiment, the temperature effective to provide one or both of de-Coke operation and desorb operation is 300 degrees Centigrade or higher. In some forms of the seventh example embodiment, de-Coke operation and desorb operation are provided in a combined process. In some forms of the seventh example embodiment, the method is performed with the engine system in a stationary or out of mission operating condition.

An eighth example embodiment is an engine system comprising: an engine including a plurality of cylinders; a plurality of fuel injectors configured to provide fuel to respective ones of the plurality of cylinders; a compression brake coupled with at least a first set of the plurality of cylinders; an exhaust aftertreatment system including a catalyst; and an electronic control system configured to: determine occurrence of a face plugging condition of the at least one catalyst, in response to the occurrence of a face plugging condition, operate the engine in a brake-fuel mode wherein the compression brake is actuated to provide compression braking of the first set of the plurality of cylinders and a second set of the plurality of cylinders receives and combust fuel provided from respective ones of the plurality of fuel injectors, and in the brake-fuel mode controlling braking of the first set of the plurality of cylinders and fueling of the second set of the plurality of cylinders such that the engine outputs exhaust at a temperature effective to provide one or both of de-Coke operation and desorb operation for the at least one catalyst. In some forms of the eighth example embodiment, the temperature effective to provide one or both of de-Coke operation and desorb operation is 275 degrees Centigrade or higher. In some forms of the eighth example embodiment, the temperature effective to provide one or both of de-Coke operation and desorb operation is 300 degrees Centigrade or higher.

In some forms of the eighth example embodiment, de-Coke operation and desorb operation are provided in a combined operation or are triggered by the same operating conditions. In some forms of the eighth example embodiment, the electronic control system is configured to operate the engine in a brake-fuel mode only with the engine system in a stationary operating condition.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:

providing an engine system including an engine configured for vehicle propulsion and including a plurality of cylinders, a plurality of fuel injectors configured to provide fuel to respective ones of the plurality of cylinders, a compression brake coupled with at least a first set of the plurality of cylinders, and an exhaust aftertreatment system including a catalyst;

operating the engine in an idle coast mode wherein the engine is decoupled from a road load and the vehicle is coasting down a hill;

determining a condition for regeneration of the catalyst; and in response to the act of determining, transitioning operating the engine to a brake-fuel mode wherein the compression brake is actuated to provide compression braking of the first set of the plurality of cylinders and a second set of the plurality of cylinders receive and combust fuel provided from respective ones of the plurality of fuel injectors;

wherein the act of transitioning occurs while maintaining the idle coast mode.

2. The method of claim 1, wherein the brake-fuel mode determines a fueling command in response only to an engine speed input.

3. The method of claim 1, wherein the act of transitioning includes controlling changes in fueling rate using a fueling rate limiter that is asymmetric for increases and decreases in fueling rate.

4. The method of claim 1, wherein the act of determining a condition for regeneration of the catalyst includes determining a condition for regeneration of a diesel particulate filter.

5. An engine system comprising:

an engine configured for vehicle propulsion and including a plurality of cylinders;

a plurality of fuel injectors configured to provide fuel to respective ones of the plurality of cylinders;

a compression brake coupled with at least a first set of the plurality of cylinders;

an exhaust aftertreatment system including a catalyst; and an electronic control system configured to:

operate the engine in an idle coast mode wherein the engine is decoupled from a road load with the vehicle coasting downhill;

determine a condition for regeneration of the catalyst; and in response to the condition for regeneration of the catalyst, transition operation of the engine to a brake-fuel mode wherein the compression brake is actuated to provide compression braking of the first set of the plurality of cylinders and a second set of the plurality of cylinders receive and combust fuel provided from respective ones of the plurality of fuel injectors;

wherein the transition occurs while maintaining the idle coast mode.

6. The engine system of claim 5, wherein the brake-fuel mode utilizes a zero net torque fueling command in response to a net torque demand of the engine effective to avoid interference with idle coast operation.

7. The engine system of claim 5, wherein the transition includes controlling changes in fueling rate using a fueling rate limiter that is asymmetric for increases and decreases in fueling rate.

8. The engine system of claim 5, wherein the condition for regeneration of the catalyst includes determining a need for regeneration of a diesel particulate filter.

9. A method comprising:

providing an engine system including an engine including a plurality of cylinders, a plurality of fuel injectors configured to provide fuel to respective ones of the plurality of cylinders, a compression brake coupled with at least a first set of the plurality of cylinders, and an exhaust aftertreatment system including a catalyst;

operating the engine in a first mode wherein the engine operates at a rated speed and a light load being 50% or less than a rated torque with the plurality of fuel injectors providing fuel to each of the plurality of cylinders;

determining a condition for regeneration of the catalyst; and in response to the act of determining, transitioning operating the engine to a brake-fuel mode wherein the compression brake is actuated to provide compression braking of the first set of the plurality of cylinders and a second set of the plurality of cylinders receive and combust fuel provided from respective ones of the plurality of fuel injectors;

wherein the act of transitioning maintains operation of the engine at the rated speed plus or minus 2.5% or less.

10. The method of claim 9, wherein the act of transitioning includes controlling changes in fueling rate using a fueling rate limiter that is asymmetric for increases and decreases in fueling rate.

11. The method of claim 9, wherein the act of determining a condition for regeneration of the catalyst includes determining a condition for regeneration of a diesel particulate filter.

12. The method of claim 9, wherein the act of determining a condition for regeneration of the catalyst includes determining a need for mitigation of a first catalyst face plugging condition.

13. An engine system comprising:

an engine including a plurality of cylinders;

a plurality of fuel injectors configured to provide fuel to respective ones of the plurality of cylinders;

a compression brake coupled with at least a first set of the plurality of cylinders;

an exhaust aftertreatment system including a catalyst; and an electronic control system configured to:

operate the engine in a first mode wherein the engine operates at a rated speed and a light load being 50% or less than a rated torque with the plurality of fuel injectors providing fuel to each of the plurality of cylinders;

determine a condition for regeneration of the catalyst; and in response to a condition for regeneration, transition operation of the engine to a brake-fuel mode wherein the compression brake is actuated to provide compression braking of the first set of the plurality of cylinders and a second set of the plurality of cylinders receive and combust fuel provided from respective ones of the plurality of fuel injectors, wherein during the transition the electronic control system maintains operation of the engine at the rated speed plus or minus 2.5% or less.

14. The engine system of claim 13, wherein during the transition the electronic control system controls changes in fueling rate using a fueling rate limiter that is asymmetric for increases and decreases in fueling rate.

15. The engine system of claim 13, wherein the electronic control system is configured to determine a condition for regeneration of a diesel particulate filter.

16. The engine system of claim 13, wherein the electronic control system is configured to determine a need for mitigation of a first catalyst face plugging condition.

17. The engine system of claim 13, wherein during the transition the electronic control system varies a load on the engine from an idle load up to a rated load.

18. The engine system of claim 13, wherein the predetermined speed is a rated speed and the predetermined speed range is a rated speed range.

* * * * *